INVENTOR.
PAUL W. AITKENHEAD
BY
HIS ATTORNEY

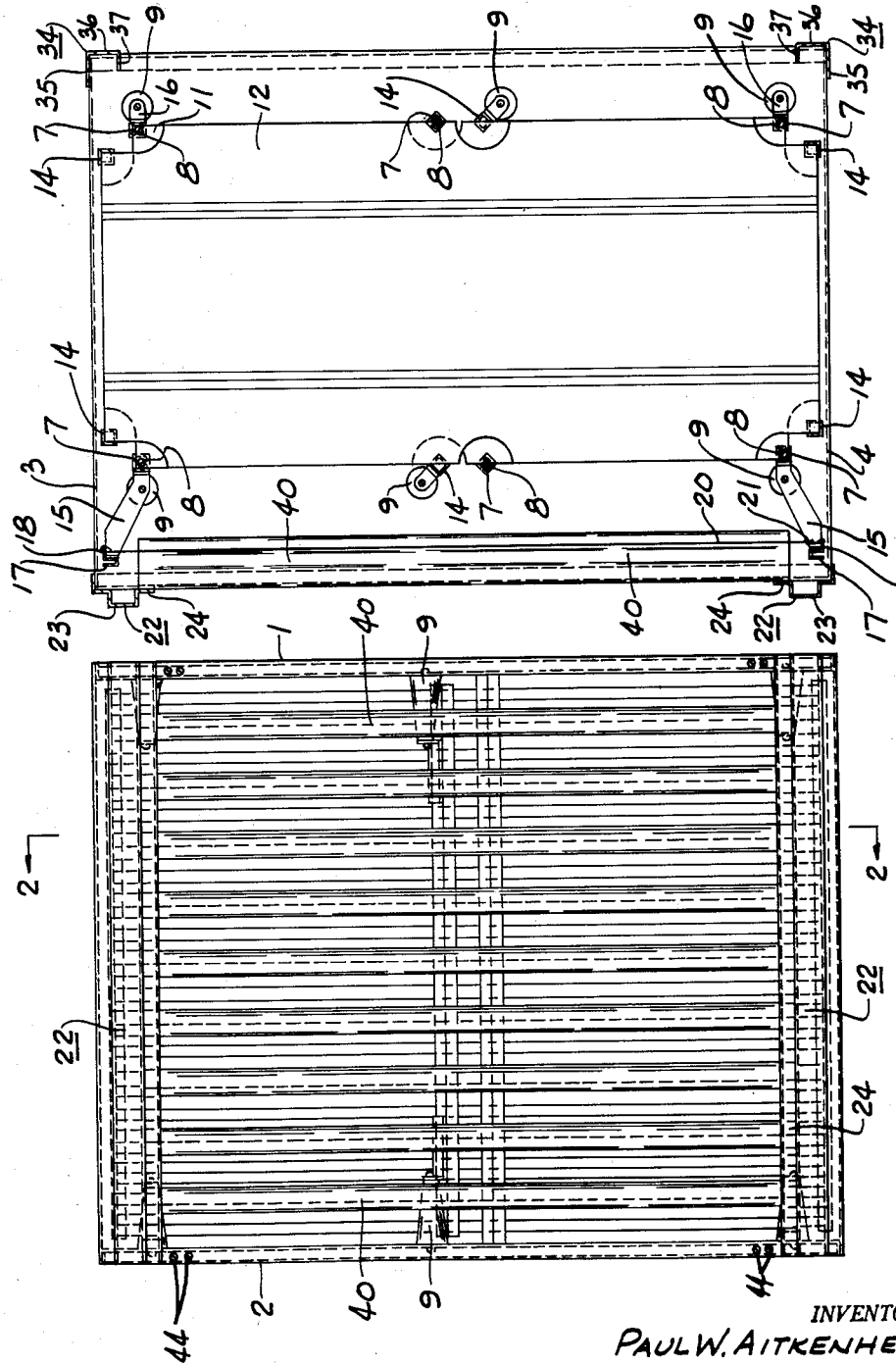

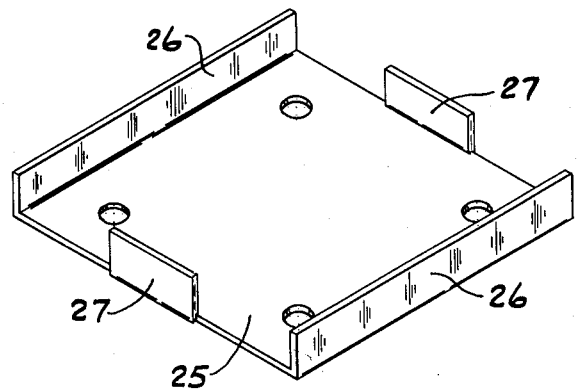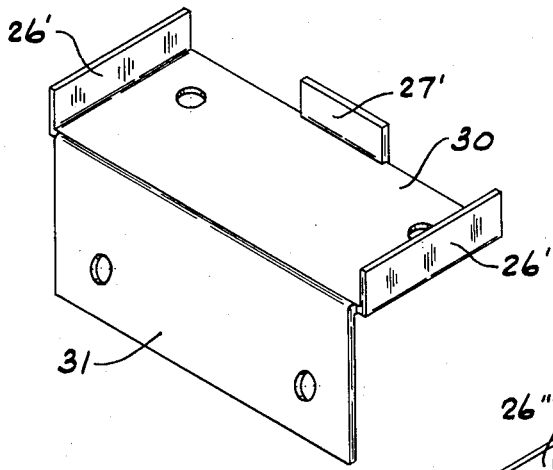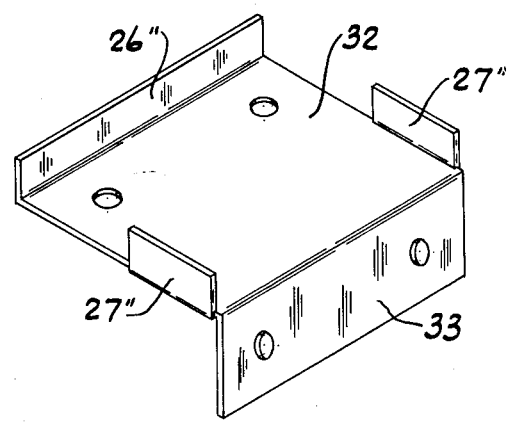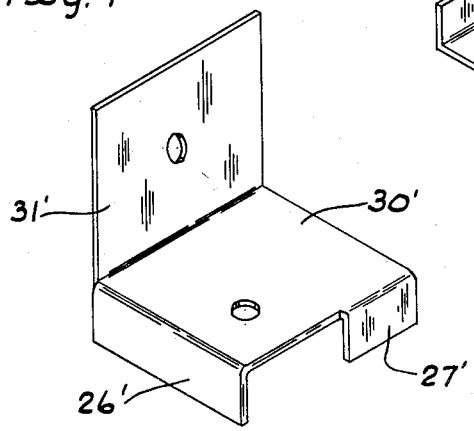

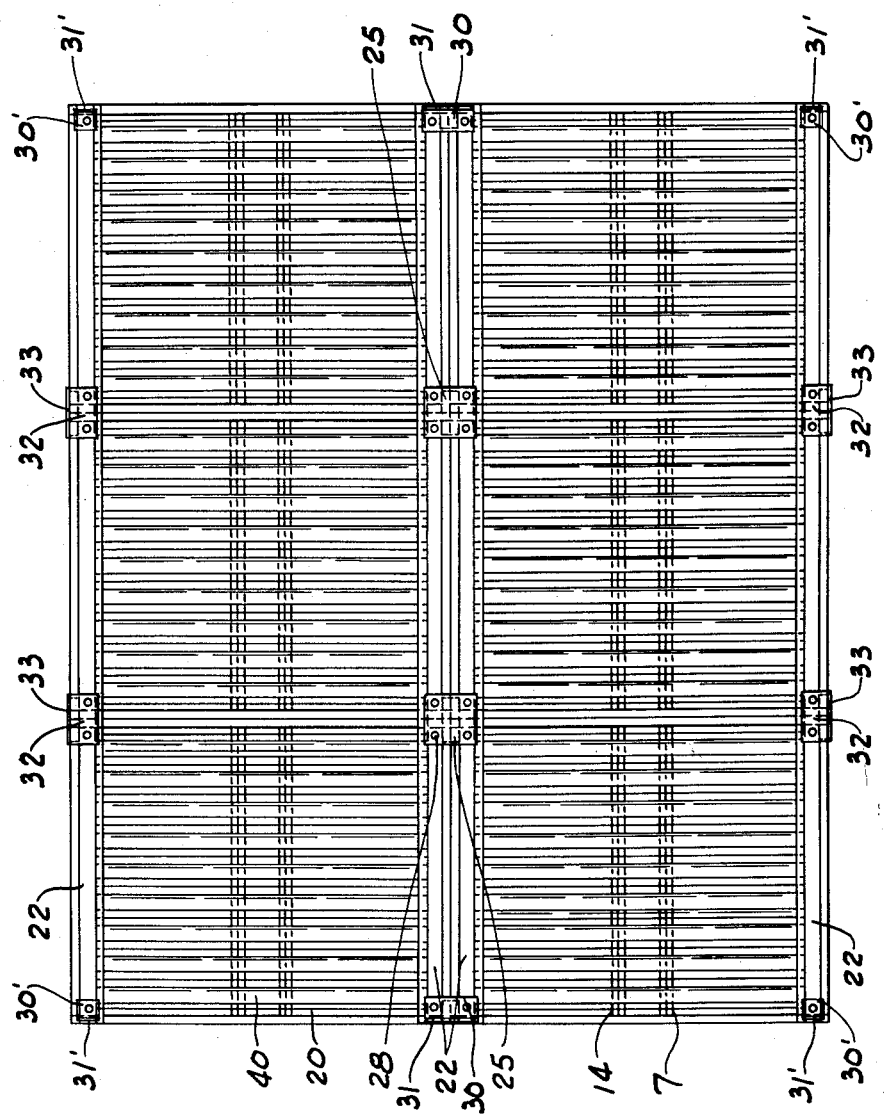

Feb. 28, 1961 P. W. AITKENHEAD 2,973,055
ELECTRONIC AIR CLEANER
Filed Aug. 28, 1957 5 Sheets-Sheet 5
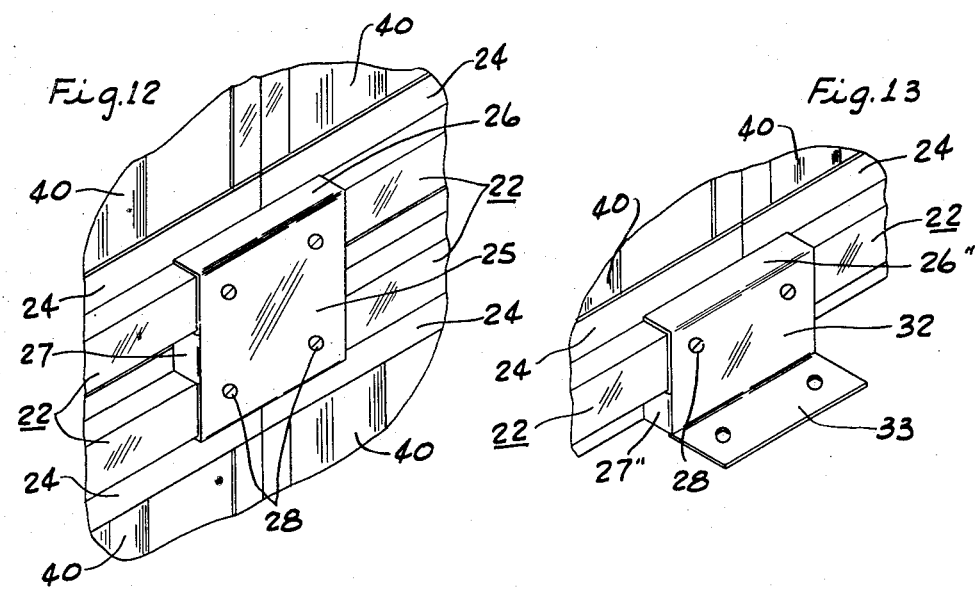
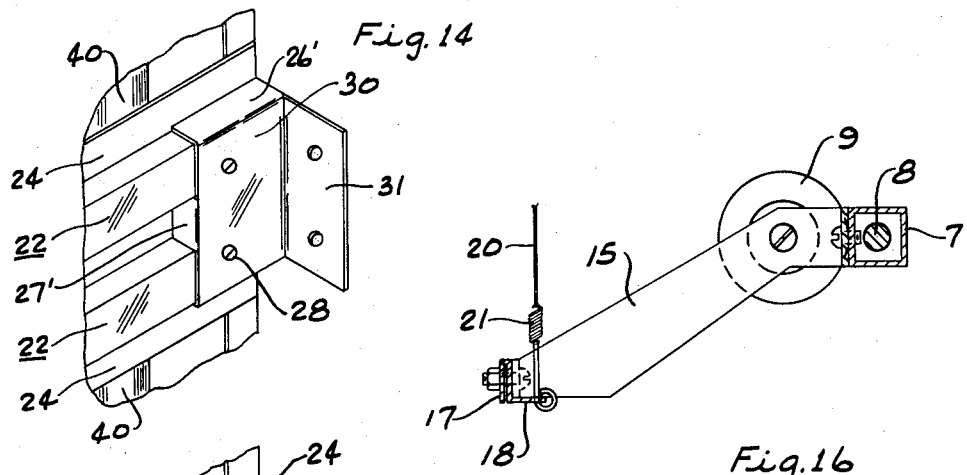
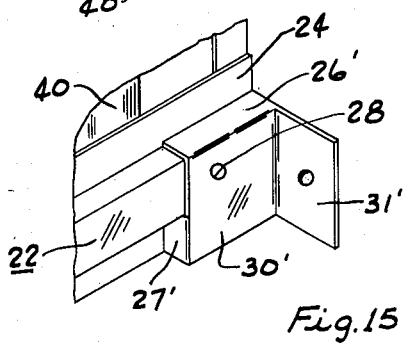
INVENTOR.
PAUL W. AITKENHEAD
BY
HIS ATTORNEY

United States Patent Office 2,973,055
Patented Feb. 28, 1961

2,973,055
ELECTRONIC AIR CLEANER

Paul W. Aitkenhead, Ross Township, Allegheny County, Pa., assignor to Electro-Air Cleaner Company, Inc., McKees Rocks, Pa., a corporation of Pennsylvania Filed Aug. 28, 1957, Ser. No. 680,842

7 Claims. (Cl. 183—7)

This invention relates generally to electronic air cleaners and more particularly to the ionizing electrodes of such cleaners.

The problem is to obtain a greater efficiency in the flow of air through the bank of closely spaced collecting plates of an electronic air cleaner after having passed the ionizing electrodes. The ionizing electrodes must be capable of carrying all of the dust particles traveling past the same and they must not interfere or otherwise unbalance the air flow before it enters the bank of closely spaced collecting plates.

It is the present practice to employ a very small wire as the positively charged electrode and a flat plate or a plate bent to the cross section of a horseshoe. The flat plates aid in entraining the air but they practically eliminate the transition zone, between the ionizing zone and the back of collecting plates, which if generous in depth, allows some equalization in the air stream before passing into the bank of collecting plates.

Ionization ability of the dust may be increased by doubling the positive electrode wires between the flat plate ionizing electrodes. The electrodes having a horseshoe cross section do not increase the percentage of dust ionization over that of the flat plate electrode but they do provide a greater disturbance of the air passing through the ionizing zone which results in further upsetting the air flow causing inefficiency in a dust collector.

The principal object of this invention is the provision of an ionizing electrode that will increase the efficiency of the electronic air cleaner by improving the air flow conditions through the ionizing electrodes and by increasing the capability of these ionizing electrodes to ionize more dust than either of the other two forms of electrodes. This improvement is obtained in the shaping and contouring of the ionizing electrode. The leading edge of the electrode with reference to the air stream is convexly rounded as an air foil. This rounded surface extends to the side of the electrode and passes through a reverse curve into a longitudinally extending concave surface that lies inwardly of the convex side of the leading edge. The zone of low pressure created at or near the reverse curve is thus cancelled by the concave surface. The concave surface when made as an arc of constant radius provides a zone of considerable width that contains maximum charging intensity particularly when the wire used as the other electrode is positioned at the center from which the radius subtends the arc of the concave surface.

The shape of the trailing edge of this electrode may then be contoured to further improve the air flow to the bank of collecting plates. The trailing edge may likewise be convexly rounded to the same or a smaller radius. It may stop short of the very trailing edge or taper into a tail plate. This tail plate may be extended so as to provide one of the collecting plates in the bank of alternately charged collecting plates which prevents further lateral distribution of the air stream after having passed the ionizing zone.

Other objects and advantages appear hereinafter in the following description and claims.

The accompanying drawings show for the purpose of exemplification without limiting the invention and claims thereto certain practical embodiments illustrating the principles of this invention wherein:

Fig. 1 is a view in front elevation of the electronic air cleaning cell comprising this invention.

Fig. 2 is a vertical sectional vew taken on the line 2—2 of Fig. 1.

Fig. 4 is a perspective view of a bracket for securing together the four adjacent corners of four unit cells.

Fig. 5 is a perspective view of a bracket for securing together the adjacent two corners of cell units on the sides of the assembly and to the housing.

Fig. 6 is a perspective view of a bracket for securing together the adjacent two corners of cell units along the top or bottom of the assembly and to the housing.

Fig. 7 is a perspective view of a bracket for securing one corner of a cell unit to the housing.

Fig. 11 is a front elevation of six cell units mounted in a housing and secured by corner brackets.

Figs. 12 to 15 are enlarged perspective views with parts broken away showing the brackets of Figs. 4 to 7 in the housing as illustrated in Fig. 11.

Fig. 16 is an enlarged detailed view of the ionizer wires mounting.

Figure 3:
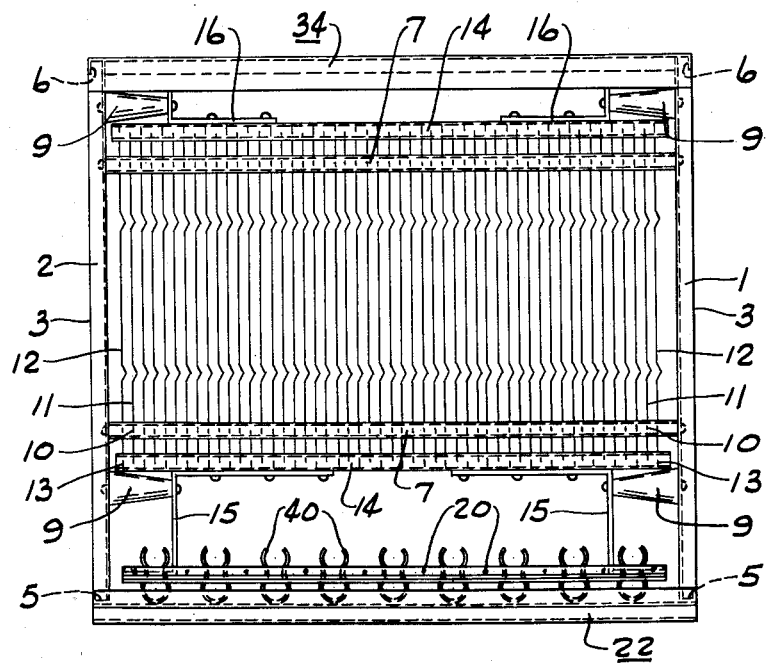
Fig. 3 is a top plan view of the electronic air cleaning cell of Fig. 1.

Referring to Figs. 1 to 3 of the drawings only a single metal cell unit is shown and is preferably made of aluminum or some metal that when treated will not corrode, or is inherently free of corrosion due to moisture. This cell may be one of a group stacked and held together by brackets and enclosed in a snug fitting sheet metal jacket.

The cell comprises the right and left side plates 1 and 2 which has the outwardly extending marginal flanges 3 and 4 at the top and bottom, and the inturned U-shaped flanges 5 and 6 on the front and rear marginal edges. These side plates are held in spaced relation by the quadrangularly arranged tubes 7 which are preferably square in cross section and through which the rods 8 extend and their threaded ends pass through aligned holes in the plates to receive nuts to hold the plates in rigid box relation. The tubes 7 have a series of slits 10 for receiving the corners of the negatively charged collecting plates 11. Four or more tubes 7 are required depending on the actual size of the cell.

The alternate or positively charged collecting plates 12 are each spaced midway between the plates 11 and selected of their corners are held in slits 13 of the tubes 14 which complete the bank of collecting plates. The plates 12 provide the outside of the bank of collecting plates as the side plates 1 and 2 function as collecting plates for the negatively charged bank. The tubes 14 which carry the positively charged collecting plates 12 in spaced relation are each secured to a bracket 15 at the top and bottom in the front of the cell and the brackets 16 in the back and the intermediate parts of the cell. Each of these brackets is supported by an insulator 9 the opposite end of which is mounted on the side plates 1 and 2.

The two pairs of front brackets 15 at the top and bottom of the cell have the angle members 17 extending therebetween and are supported thereby. The angles 17 shown are formed with the depending lip 18 having the uniformly spaced holes to receive the ionizing wires 20 which are tied at end and have springs 21 at the other end so that the wires will not break when accidentally touched when assembling the units. The springs merely expand and when the obstruction is removed the positive electrode wires move back into their proper suspended position. The face of this angle member 17 is formed by turning the material back on itself to stiffen the same without adding material weight or size in the angle. Thus the positively charged electrode wires 20 and the correspondingly charged collecting plates 12 have the same voltage and are supported by the same insulators extending from the side plates 1 and 2 as shown in Fig. 16.

The face of the cell unit as shown in Fig. 1 is formed by the top and bottom channel brace members 22 which are identical being provided with a box section 23 with an inwardly extending face flange 24 formed by doubling the metal back on itself and which extend toward each other from the top and bottom of the front face of the cell and the oppositely extending flange 24 extending from the other edge of the box and terminating in a horizontal flange that extends over the flanges 3 and 5 of both side plates 1 and 2 and its edge being substantially in the same plane as that of the angle members 17 supporting the positively charged electrode wires.

The box section 23 is employed to line up adjacent cells stacked together to make up a large electronic air cleaner having many cells. As shown in Fig. 4 of the drawings the brackets 25 which are substantially square in shape have opposed longitudinal flanges 26 on two opposite sides of the bracket and opposed short flanges 27 on the two other opposite sides of the bracket. The box sections 23 at the adjacent corners of four adjacent units may thus be secured together by passing therein four metal drive screws 28.

The bracket 30 shown in Fig. 5 connects the adjacent corners of two unit cells that are on the perimeter of the assembled cells. This bracket has one-half the flanges of the bracket 25 and the other half are replaced by the flange 31 which may be secured to the housing that fits against the flanges 3, 4, 5 and 6 of the side plates of the perimetral unit cells in the assembly. The other flanges 26' and 27' function in the same manner as the bracket 25. The bracket 32 of Fig. 6 is shaped to join adjacent cell units at the top and bottom of the assembly and its flanges 26" and 27" function as do the corresponding flanges to interlock the box sections 23 and the flange 33 is arranged to secure this joint to the top or bottom of the housing that snugly surrounds the whole assembly of cell units. The bracket 30' of Fig. 7 is just half of the bracket 30 for attaching one corner of one unit to either side of the housing and has the flanges 26', 27' and 31'.

As shown in Fig. 2, the rear of each cell has two corresponding corner brace members 34 formed in the shape of angle members 35 and 36 each with short inturned flanges 37 the ends of which are cut short to gauge against the inside of the sides 1 and 2.

Figures 8, 9, 10:
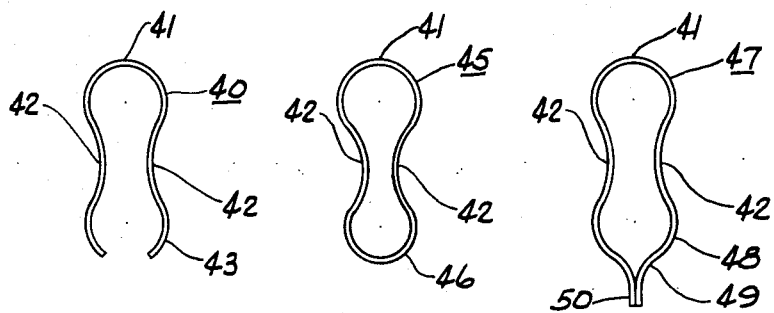
Fig. 8 is an enlarged sectional view of the negatively charged electrode.
Fig. 9 is an enlarged sectional view of a negatively charged electrode having a closed rounded edge of less radius than the leading edge.
Fig. 10 is an enlarged sectional view of a negatively charged electrode having a trailing edge with a tail.

The front brace channel members 22 have welded as indicated at 39 to their folded face flanges 24 the series of negatively charged electrodes 40 which are uniformly spaced between the positively charged wire electrodes 20. As shown in Fig. 8, the electrodes 40 have a convexly rounded leading edge 41, an intermediate concavely curved intermediate surface 42, that may be the arc of a circle the center of which is the wire 20, and a convexly rounded trailing edge 43 which is open. Thus the whole of each concave arcuate surface 42 is the same distance from the positively charged electrode 20.

As shown in Figs. 3 and 8 the trailing edge 43 is left open. Different cross-sectional forms of negative electrodes are shown in Figs. 9 and 10.

There are nine of the negative electrodes 40 welded at their ends to the top and bottom channel brace members 22 to form this portion of the structure into a rugged and sturdy frame which is screwed to the corners of the side plates by the metal drive screws 44. Since a positively charged wire electrode 20 is next adjacent the side plates 1 and 2 there are ten positively charged wire electrodes in all and the side plates 1 and 2 make up the total of eleven negatively charged ionizing electrodes. The positively charged electrode wires 20 are mounted in the same center as that forming the concave arcuate surface 42. A positively charged collecting plate 12 is directly behind the center of each negatively charged ionizing electrode. There are two intermediate positively charged collecting plates making three intermediate negatively charged collecting plates making a total of twenty-nine positively charged collecting plates and twenty-eight negatively charged collecting plates and with the side plates 1 and 2 a total of thirty. Each of these collecting plates are corrugated at the same relative position to give them strength and their corners are cut away from the opposite pole to provide good electrical clearance. Off the ends of the tubes that support the positively charged collecting plates, corresponding indentations are formed in the side plates 1 and 2 to provide good electrical clearance.

The cross-sectional structure of the negatively charged electrodes of Figs. 1 to 3 is shown in Fig. 8. The adjacent wires 20 are positioned at the centers, the radius of which are common to concave arcuate surfaces 42 on opposite sides of the electrode 40. The trailing convexly curved sides 43 are substantially the same radius as the sides of the convexly curved sides of the leading edge 41. The leading and trailing surfaces 41 and 43 are preferably of a smaller radius than that of the concave surface 42.

In the structure of Fig. 9 the negatively charged electrode 45 has the same leading edge 41 and the same concave surfaces 42, each part of which is the same radius from the wires 22 but the trailing convexly curved surfaces 46 are closed at the trailing or back. This allows the air stream to equalize from one side of the electrode to the other without stream interference from the open edges of the structure shown in Fig. 8. Another difference in the structure of Fig. 9 is that the diameter of the trailing convexly rounded surface 46 is less than that of the diameter of the leading edge. This aids in the air flow and improves the distribution of unbalanced portions of the air stream passing through this electronic air cleaning cell.

The structure of Fig. 10—the leading edge 41 and the trailing edge 48 with the intermediate concave section 42 are the same as that shown in Fig. 9. The trailing surface 48 terminates in the fillet or reverse curve 49 that terminates in the longitudinal trailing plate 50. This trailing plate 50 prevents excessive transverse distribution of air but aids in entraining the air stream. This plate 50 may extend into and become one of the negatively charged collecting plates. These shapes produce an improved air flow for the purpose of more thoroughly ionizing the particles of dust leaving the charging zone and entering into the collecting plates. The space between these electrodes 40 and the collecting plates together with the air flow shape of the former improves the ionization of the dust particles passing therethrough and thus improves the overall dust collecting efficiency of the electronic cleaner. The gap is somewhat greater than the depth of the electrodes 40 as seen in Fig. 3. This is an important improvement of this invention.

I claim:

1. An electronic air cleaner comprising a tubular housing surrounding a bank of parallel collector plates and an ionizer, alternate of said collector plates mounted for connection to positive polarity and the balance mounted for connection to ground, said ionizer mounted in front of said collector plates and including an alternate series of parallel ionizing wires and electrodes mounted for connection to positive and ground, each electrode having a leading edge up air stream of an associated ionizing wire, a side facing said wire and a trailing edge, said leading edge being convexly rounded and extending back along a side through a rounded reverse curve into a concave surface facing an ionizing wire, the trailing end of each of said ionizing electrodes extending through a second convexly rounded reverse curve.

2. The ionizer of claim 1 characterized in that said concave surface is of constant radius the center of which is that of the ionizing wire.

3. The ionizer of claim 1 characterized in that the rounded convex surface of said second reverse curve of said electrode is less extensive than said first rounded convex surface but lies beyond said concave surface.

4. The structure of claim 1 characterized in that said second convexly rounded surface is approximately the same radius as that of said first convexly rounded surface.

5. The structure of claim 1 characterized in that said second convexly rounded surface is of smaller radius than that of said first convexly rounded surface.

6. The structure of claim 1 characterized in that said second convexly rounded surface extends uniformly into a longitudinal trailing plate.

7. The structure of claim 1 characterized in that said longitudinal trailing plate is one of said collecting plates.

References Cited in the file of this patent

UNITED STATES PATENTS

| | | |
|---|---|---|
| 1,119,469 | Strong et al. | Dec. 1, 1914 |
| 2,476,248 | MacKenzie | July 12, 1949 |
| 2,489,786 | Klemperer | Nov. 29, 1949 |
| 2,900,042 | Coolidge et al. | Aug. 18, 1959 |

FOREIGN PATENTS

| | | |
|---|---|---|
| 431,216 | Germany | July 6, 1926 |